United States Patent [19]

Davister et al.

[11] Patent Number: 4,777,027

[45] Date of Patent: Oct. 11, 1988

[54] CONTINUOUS PROCESS FOR PREPARING PHOSPHORIC ACID AND CALCIUM SULPHATE

[75] Inventors: Armand L. Davister; Francis A. Thirion, both of Liège, Belgium

[73] Assignee: Prayon Developpment, Societe Anonyme

[21] Appl. No.: 792,495

[22] Filed: Oct. 29, 1985

[30] Foreign Application Priority Data

Nov. 5, 1984 [LU] Luxembourg ............................ 85628
May 21, 1985 [LU] Luxembourg ............................ 85906

[51] Int. Cl.$^4$ ............................................ C01B 25/16
[52] U.S. Cl. ..................................... 423/320; 423/166; 423/167; 423/319; 423/555
[58] Field of Search ............... 423/167, 320, 321, 555, 423/166

[56] References Cited

U.S. PATENT DOCUMENTS 3,632,307  1/1972  Van Es et al. ..................... 423/320
4,298,583  11/1981  Davister et al. ..................... 423/320
4,524,057  6/1985  Bigot ..................................... 423/167

OTHER PUBLICATIONS

Slack, *Phosphoric Acid*, vol. 1, Part 1, (1968), Marcell Dekker Inc., pp. 91–96.

Primary Examiner—John Doll
Assistant Examiner—Wayne A. Langel
Attorney, Agent, or Firm—Laff, Whitesel, Conte & Saret

[57] ABSTRACT

There is described a process which comprises adjusting on the one hand the flow rates of a circulating mixture relative to a base flow rate according to very specific specifications, and on the other hand so adjusting the reaction conditions in succeeding reaction zones as to obtain a production phosphoric acid with a $P_2O_5$ concentration between 33 and 52%, and a $H_2SO_4$ concentration between 0.25 and 2.5%, and calcium sulphate in the form of dihydrate, hemihydrate, anhydrite or a mixture of at least two said crystalline forms.

36 Claims, 5 Drawing Sheets

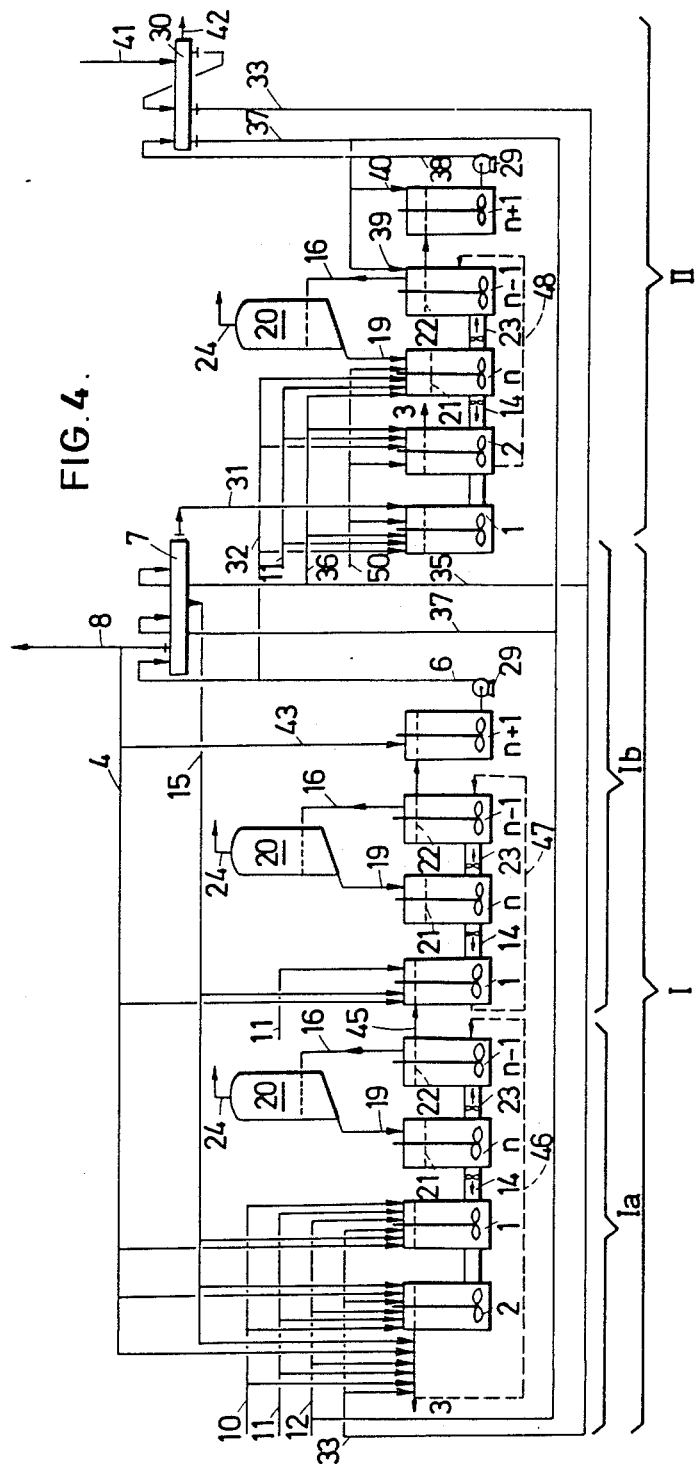

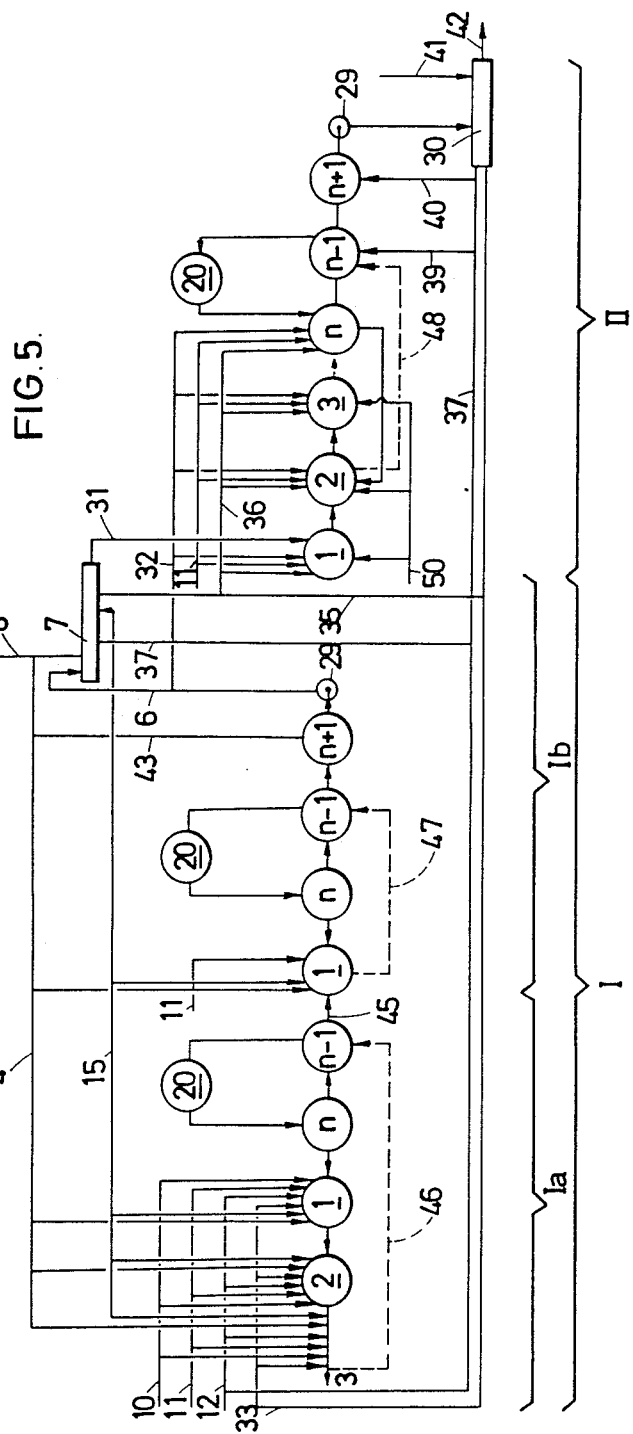

CONTINUOUS PROCESS FOR PREPARING PHOSPHORIC ACID AND CALCIUM SULPHATE

This invention relates to a method for preparing phosphoric acid and calcium sulphate as by-product, which comprises subjecting in a mixture containing calcium sulphate flowing through a reaction zone sequence, calcium phosphate to an attack by a mixture of sulfuric and phosphoric acids, while separating calcium sulphate and extracting at least part of the production phosphoric acid.

This is more particularly a process for preparing phosphoric acid with high $P_2O_5$ content and relatively low $H_2SO_4$ content on the one hand, and calcium sulphate as by-product on the other hand, which may notably be comprised of dihydrate, α-hemihydrate, II-anhydrite or a mixture in very varying ratios of two or three said crystalline forms. Thus when it is stated that the resulting calcium sulphate essentially contains one said crystalline forms, it should be understood that the content thereof is higher than each one of said other forms, but it is not necessarily higher than 50% of the total amount calcium sulphate.

According to the present practice, the sulphate which has been first dry- or moist-crushed, is fed to a mixture formed by phosphoric acid with high $P_2O_5$ content, and calcium sulphate hemihydrate crystals, said calcium sulphate then being subjected to a separation operation, notably by filtering, wherein the production phosphoric acid is removed.

In the separation step, which is thus generally performed by filtering, two techniques are being used: As a first possibility, the hemihydrate cake resulting from the filtering is washed with water and comprises the final by-product, the filtrate being cycled back to the attack. The second possibility lies in crystallizing during a second step, the hemihydrate, after removing the phosphoric acid, back into dihydrate by modifying the temperature and acidity conditions, whereby said calcium sulphate is subjected anew to a filtering operation.

The resulting dihydrate cake is wished with water and comprises the final by-product, while the filtrate is cycled back to the first step and the washing waters are cycled back upstream of the second step or to the first step.

The moist-way processes used in the industry, which enable producing concentrated phosphoric acid (more than 40% $P_2O_5$) have long met difficulties resulting from the simultaneous production of hemihydrated calcium sulphate and the high-temperature working: the working conditions cause corroding and encrusting phenomenons which have only been conquered by means of the improvements resulting from scientific research in the chemistry, chemical engineering and structural material areas.

G-B Pat. No. 313,036 as well as U.S. Pat. No. 1,902,648 described the producing of phosphoric acid together with the obtaining of calcium sulphate hemihydrate, said hemihydrate then being converted to dihydrate to separate same by a filtering and washing operation.

U.S. Pat. No. 1,836,672 pertains to a two-stage process, that is a first stage which comprise reacting phosphate and sulfuric acid while simultaneously producing hemihydrate and concentrated phosphoric acid, said latter acid then being separated by a filtering operation, while in a second stage, the hemihydrate still impregnated with phosphoric acid, is brought back in suspension in a sulphophosphoric medium, under such acidity and temperature conditions that the calcium sulphate crytallizes back to dihydrate.

Belgian Pat. Nos. 660,216 and 683,739 pertain to processes for preparing phosphoric acid wherein reacting the phosphate with sulfuric acid in dihydrate medium goes together with producing an acid with a middle $P_2O_5$ titre in the range from 30 to 35%. The resulting calcium sulphate is attached again under higher temperature and acidity to purify and crystallizes same back to α-hemihydrate, which is then filtered, washed and put into storage where it is hydrated back by absorbing the residual moisture thereof.

Luxemburg Pat. No. 84,713 dated Mar. 25, 1983 pertains to a process enabling to obtain on the one hand a concentrated phosphoric acid with more than 40% $P_2O_5$, and on the other hand by means of a sequence of three crystallizings, a commercial-grade calcium sulphate.

As however this process is relatively intricate and costly, it is only justified in some cases, notably when the resulting calcium sulphate may be used directly, without subsequent purification, to produce industrially-valid products.

An essential object of the present invention is to obviate the drawbacks of said known processes and to provide a very flexible process enabling to strictly control all the parameters and thus to adapt same easily to the nature of the phosphates to be treated and to the use being considered for the production calcium sulphate, while minimizing the energy costs.

More particularly, this invention has for purpose to produce an acid with high $P_2O_5$ content by means of a controlled attack in dihydrate or α-hemihydrate calcium sulphate medium, to develop a very flexible process enabling to strictly master within very narrow limits all the parameters, and thereby to make said parameters stable whatever be the nature of the phosphates to be treated, whether they be dry or moist, and to direct the production calcium sulphate crystallizing according to the use being considered for said sulphate, while minimizing the capital costs and energy costs.

Thus the process according to the invention has more particularly for purpose, but not exclusively, the direct use of moist phosphate without pre-drying being required and this with throughputs and $P_2O_5$ titres for the production phosphoric acid which are relatively high.

For this purpose according to the invention, the process comprises adjusting the circulating mixture flow rates relative to a base mixture flow rate corresponding to the flow rate being discharged from the reaction zones, according to the following specifications:

- a general circulation through at least a substantial number of the reaction zones with a rate lying between 300 and 4000% of the base flow rate,
- a circulation through a vacuum cooling zone with a rate lying between 2000 and 4000 of said same base flow rate,
- local circulations in the reaction zones with rates each lying between 500 and 2000% of said same base flow rate,
- the sum of the general circulation and local circulation being higher than or equal to 2500% of the base flow rate in each one of those zones where reactants are being added, as well as in that zone which follows directly same in the general circulation circuit, and retaining in the reaction zones the following reaction conditions:

- a temperature lying between 30° and 105° C., preferably from 30° to 90° C.,
- a phosphoric acid with a $P_2O_5$ concentration between 15 and 52%,
- a sulfuric acid concentration between 0.25 and 25%,
- a solid content lying between 15 and 62%, preferably 20 to 62%,
- a residence or reaction time between 1 and 23 hours, the reaction conditions being so selected and combined within said limits as to obtain on the one hand a production phosphoric acid having a $P_2O_5$ concentration lying between 33 and 52%, and a $H_2SO_4$ content lying between 0.25 and 2.5%, and on the other hand calcium sulphate as by-product, (a) essentially in dihydrate form by re-crystallizing α-hemihydrate or by an unchanged crystalline by selecting and combining within said reaction condition limits, a relatively low to middle $H_2SO_4$ concentration with a relatively low $P_2O_5$ concentration, (b) essentially in II-anhydrite form by re-crystallizing dihydrate by selecting and combining within said reaction condition limits, a relatively low to middle temperature with a relatively low $P_2O_5$ concentration and a middle or relatively high $H_2SO_4$ concentration, or (c) essentially in α-hemihydrate form either by re-crystallizing dihydrate or by unchanged crystallizing of the hemihydrate by selecting and combining within said reaction condition limits, a relatively high temperature with a middle $P_2O_5$ concentration and a middle to relatively low $H_2SO_4$ concentration.

The various mixture circulations as defined hereinabove have already been disclosed in Luxemburg Pat. No. 78,457 dated Nov. 4, 1977.

It has now been surprisingly discovered that by using said circulation technique, the number of steps for producing a concentrated phosphoric acid and an industrially-valid calcium sulphate may be lowered to two steps and in some cases, even to one step.

More particularly, it has been startingly discovered that the attack of phosphate in hemihydrate and/or dihydrate-concentrated acid medium did not have absolutely to be made in a sulphate-deficient medium, but could to the contrary be made with a low or zero sulfate ion excess.

In a particularly advantageous embodiment, in a first part of said reaction zone sequence, wherein tricalcic phosphate is fed, there is maintained a temperature lying between 75° and 85° C., preferably between 78° and 82° C., and a sulfuric acid concentration between 0.25 to 0.85%, in such a way as to perform a substantially complete attach of said tricalcic phosphate, and there is retained during a second subsequent part communicating with said first reaction zone part, a temperature lying between 65° and 75° C. and a sulfuric acid concentration lying between 1 and 2.5%, in such a way a to solubilize $P_2O_5$, combined with $Ca^{++}$, in the form of $HPO_4^{--}$ and/or $H_2PO_4^{--}$.

Other details and features of the invention will stand out from the following description, given hereinbelow by way of non limitative example and with reference to the accompanying drawings, in which:

FIG. 4 is a diagrammatic elevation view of a third embodiment of a particular equipment for the working of the process according to the invention.

FIG. 5 is a diagrammatic plan view of the equipment as shown in FIG. 4.

In said various figures, the same reference numerals show identical or similar elements.

Figure 1:
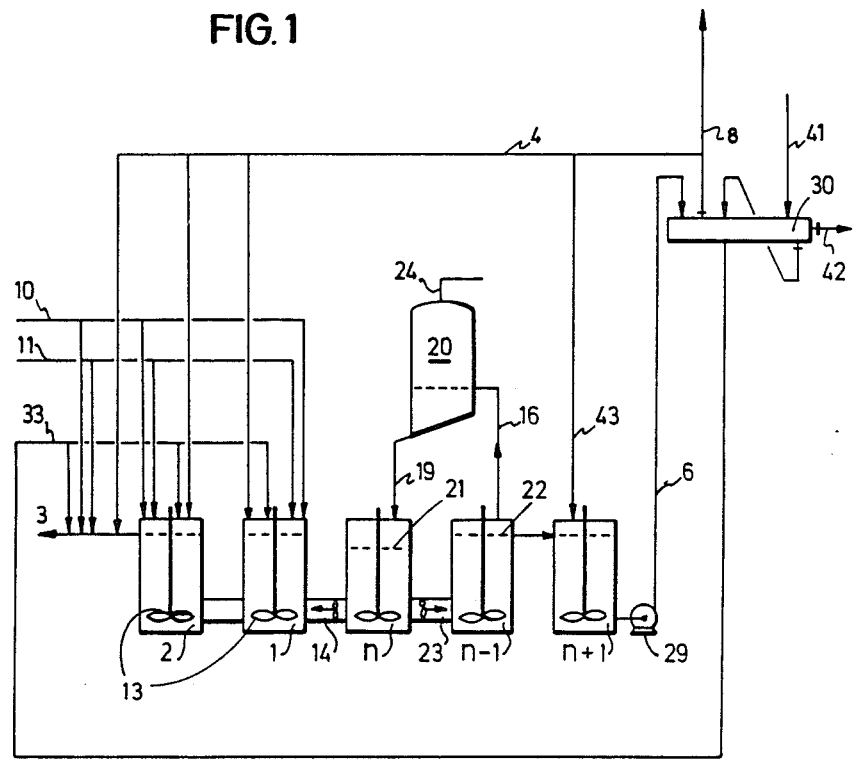
FIG. 1 is a diagrammatic elevation showing of an equipment according to a first embodiment, for the working of the process according to the invention.

The invention generally pertains to a continuous process for preparing concentration phosphoric acid having notably a high $P_2O_5$ concentration, generally in the range from 33 to to 52% $P_2O_5$ with a relatively low sulfuric acid content.

At the same time calcium sulphate is produced as by-product, the crystalline form thereof may be very varied as already stated hereinabove, but the good filterability thereof allows reaching very high throughputs.

Thus said object is reached according to the invention on the one hand by a very discerning control of the flow rates and circulations of that mixture containing calcium sulphate through a sequence of reaction zones, and on the other hand by adjusting the various reaction conditions in said mixture, such as temperature, $P_2O_5$ and sulfuric acid concentration, solid content and residence or reaction time.

Calcium phosphate is subjected in said mixture to an attack by a mixture of sulfuric and phosphoric acids, the production phosphoric acid is removed and calcium sulphate is separated as by-product.

The flow rates of the circulating mixture are adjusted relative to a base flow rate for said mixture which corresponds to the flow rate being discharged from the reaction zones, according to the following specifications:

- a general circulation through an essential number at least of the reaction zones with a rate lying between 3000 and 4000% of the base flow rate,
- a circulation through a vacuum cooling zone with a rate lying between 2000 and 4000% of said same base flow rate,
- local circulations in the reaction zones with rates each lying between 500 and 2000% of that same base flow rate,
- the sum of the general circulation and the local circulation being higher than or equal to 2500% of the base flow rate in each one of those zones where reactants are being added as well as in that zone which follows directly each said zones in the general circulation circuit.

As regards the reaction conditions in said mixture, they lie within the following limits:

- a temperature lying between 30° and 105° C., preferably from 30° to 90° C.,
- a phosphoric acid with a $P_2O_5$ concentration between 15 and 52%, preferably from 15 to 48%
- a sulfuric acid concentration lying between 0.25 and 25%,
- a solid content lying between 15 and 62%, preferably from 20 to 62%,
- a residence or reaction time between 1 and 23 hours.

Said reaction conditions are so selected and combined within said limits as to obtain on the one hand a production phosphoric acid having a $P_2O_5$ concentration lying between 33 and 52%, and a $H_2SO_4$ concentration lying between 0.25 and 2.5%, and on the other hand calcium sulphate as by-product, (a) essentially in dihydrate form by re-crystallizing α-hemihydrate or by an unchanged crystallizing by selecting and combining within said reaction limits a relatively low to middle $H_2SO_4$ temperature and concentration with a relatively low $P_2O_5$ concentration, (b) essentially in II-anhydrite form by recrystallizing dihydrate by selecting and combining within said reaction condition limits a relatively low to middle temperature with a relatively low $P_2O_5$ concentration and a middle or relatively high $H_2SO_4$ concentration, or (c) essentially in hemihydrate form either by re-crystallizing dihydrate or by unchanged crystallizing of α-hemihydrate by selecting and combining within said reaction condition limits a relatively high temperature with a middle $P_2O_5$ concentration and a middle to relatively low $H_2SO_4$ concentration.

Advantageously to obtain essentially calcium sulphate dihydrate as by-product, there is maintained at least in the final or end reaction zones, the following reaction conditions:

a temperature lying between 30° and 80° C., a $P_2O_5$ concentration between 15 and 20% and a sulfuric acid concentration lying between 4 and 15%.

When it is desired to obtain essentially α-hemihydrate calcium sulphate as by-product, there is advantageously retained at least in said end reaction zones, the following reaction conditions:

a temperature lying between 80° and 95° C., a $P_2O_5$ concentration between 22 and 35%, and a sulfuric acid concentration lying between 4 and 15%.

Finally to obtain essentially calcium sulphate II-anhydrite as by-product, good results are obtained by retaining at least in said end reaction zones, the following reaction conditions:

a temperature lying between 30° and 70° C., a $P_2O_5$ concentration between 15 and 20%, and a sulfuric acid concentration between 12 and 25%.

More particularly, it has been noted according to the invention that a calcium sulphate containing between 2 and 30% II-anhydrite, prepared according to the above-described process, has good filtering properties and an acid content which may in some cases be very much lowered.

This object is obtained by a very discerning control of the changes in $Ca^{++}$ and $SO_4^{--}$ concentrations and temperature variations in the reaction zones.

FIG. 1 pertains to a plant for preparing phosphoric acid in a single step.

Said plant comprises a succession of tanks 1 to n, partitioned or not, and connected in series in a closed circuit. Moreover, a tank n+1 is connected to tank n−1 and connected through a pump 29 and a line 6 to a filter 30.

A vacuum evaporator 20 communicates with tanks n−1 and n through respective barometric columns 16 and 19, the top portion of evaporator 20 being provided with a vapour-discharge discharge line as shown by reference numeral 24.

According to the invention, in a mixture flowing through said tanks which determine a reaction zone sequence, calcium phosphate is subjected to an attack by a mixture of sulfuric and phosphoric acids.

Calcium phosphate is fed in 10, mainly into tank 1 and possibly for some phosphate kinds, partly into tanks 2 and/or 3 to avoid disturbing the balance of temperature, acidity, solid content, etc. in the reaction zones.

The sulfuric acid and phosphoric acid are fed in diluted condition in 11 and 33, sometimes into a single tank, but mostly into a plurality of tanks 1 to n.

Inside said tanks 1 to n, a local circulation is retained by means of one or a plurality of stirrers 13, and a general mixture circulation is simultaneously retained through tanks 1 to n by circulating devices 14, which cause the mixture to pass from one tank to the following one.

Part of the mixture passing through the various tanks 1 to n is subjected to cooling and is therefor drawn from tank n−1 through barometric pipe 16 which feeds the cooler evaporator 20. There prevails therein a lowered pressure, a so-called "vacuum", suitable for causing part boiling of the mixture water.

After cooling due to said part boiling the mixture flows through line 19 to tank n.

The circulation from tank n−1 to tank n through cooler evaporator 20 and barometric pipes 16 and 19 may for example be obtained by retaining between both said tanks, a difference between levels 21 and 22. Such difference results from the action of circulating devices 14 which cycle through tanks 1 to n−1, the mixture back along said general circulation.

The "vacuum" with the required strength is generated in the cooler evaporator 20 by known means not shown in the figures, and connected to line 24, such as a steam ejector-condensor or a vacuum pump-condensor. Said strength is in relation with the heat amount to be dissipated, the mixture flow rate and the mixture composition.

Conveying the mixture to filtering may occur by succeeding overflowings from tanks n−1 to n+1 and through pump 29 which feeds said mixture to filter 30, which is generally located at a relatively high level, by means of line 6.

The calcium sulphate is thus separated from the mixture and a portion 8 from the production phosphoric acid is removed. The other portion of said acid is cycled through lines 4 and 43 to tanks 1 to n+1, allowing controlling the $P_2O_5$ content therein.

The thus-formed calcium sulphate cake in filter 30 is then subjected to washing with hot water, as shown by arrow 41. Said washing water which thus contains diluted phosphoric and sulfuric acids, is cycled through line 33 back to the first tanks, notably with the purpose of diluting the mixture inside said tanks.

The thus-washed cake is then discharged as shown by arrow 42.

The mixture flow rate being discharged from the reaction zones, that is in this case through line 6, comprises the mixture base flow rate.

All the tanks are retained under slight underpressure relative to atmospheric pressure, to insure a thorough ventilating of the reaction media and avoid polluting.

Due to the circulation through the various tanks, the parameters may vary somewhat from one tank to another one. It is consequently normal that the concentrations be somewhat different in those tanks where the reactants are fed relative to those tanks wherein no reactant is being fed.

The accurate selection of the various parameters in the mixture circulation circuit should be determined as a function of the nature of the phosphate being used. This may however be determined by experiment within the above-defined limits and from the disclosure in the above-mentioned Luxemburg Pat. No. 78,457.

Figure 2:
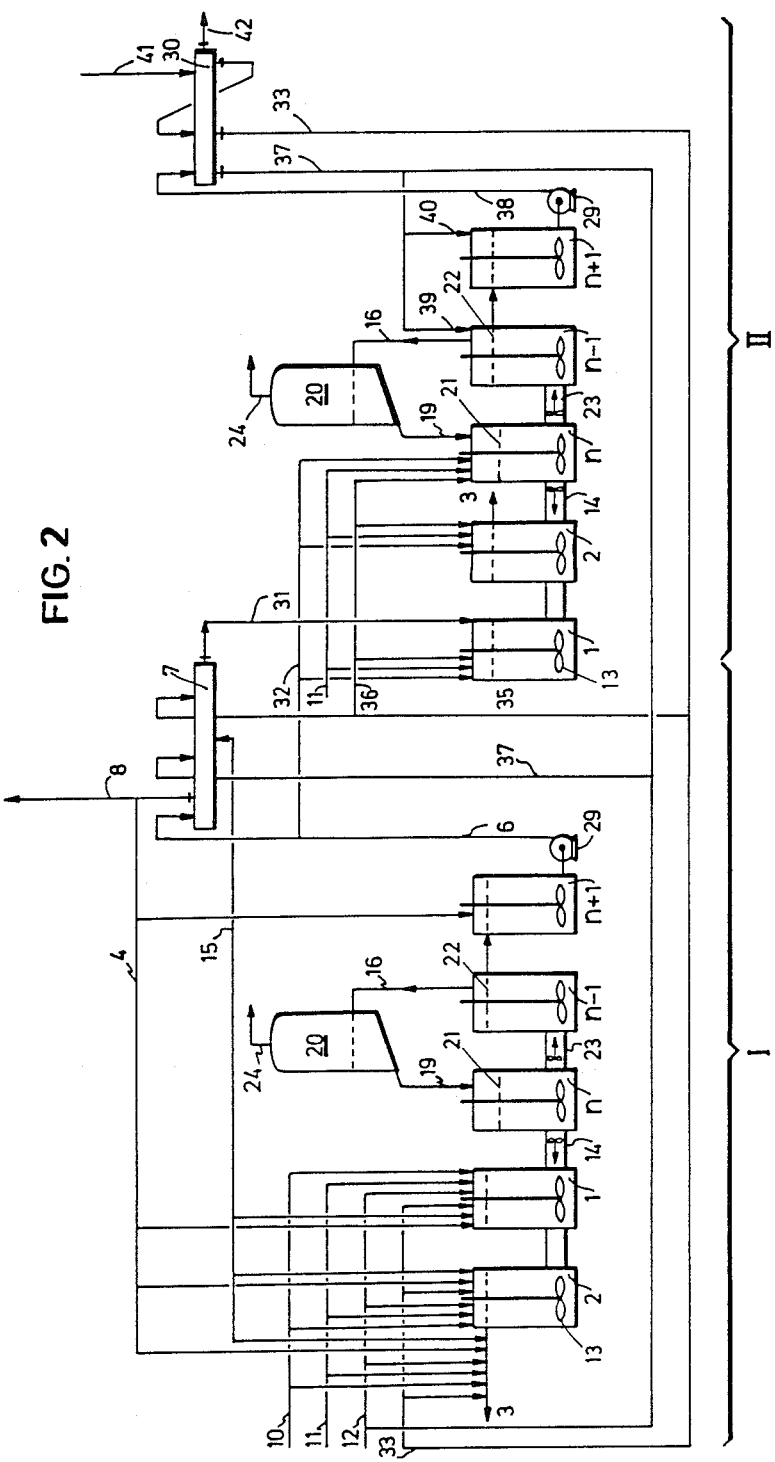
FIG. 2 is also a diagrammatic elevation showing of a second embodiment of an equipment for the working of the process according to the invention.
Figure 3:
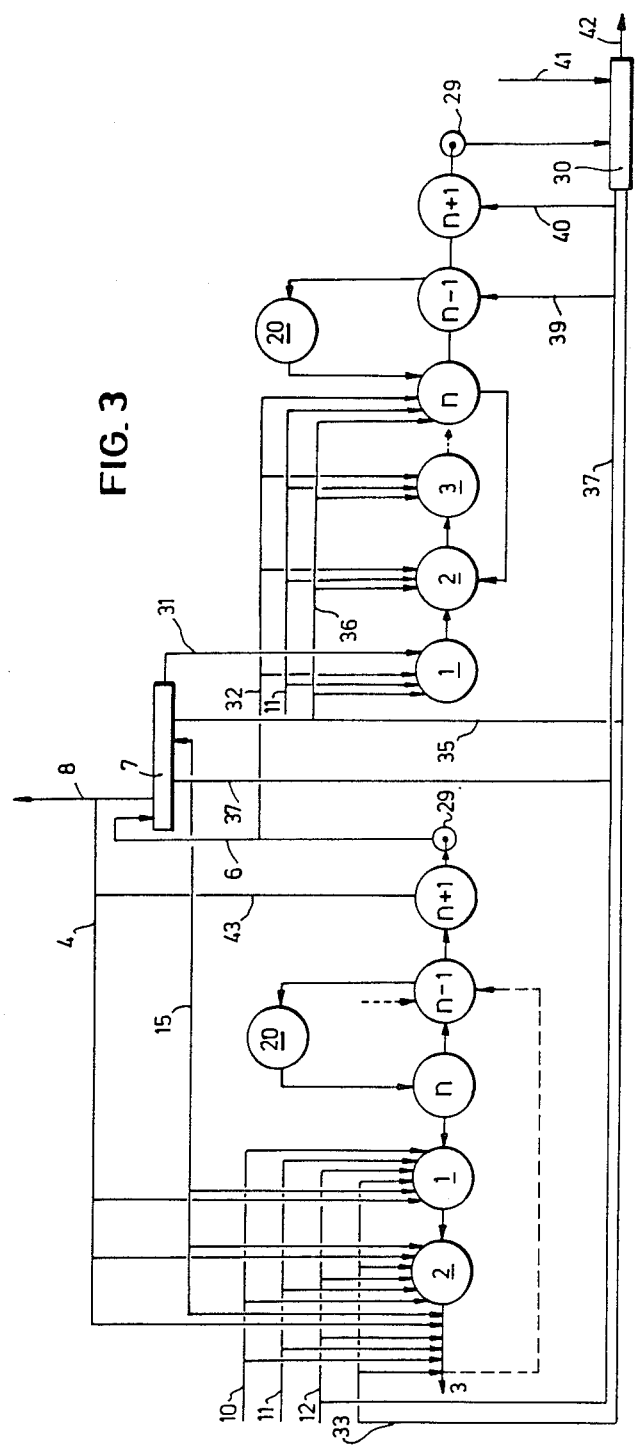
FIG. 3 is a diagrammatic plan view of the equipment as shown in FIG. 2.

FIGS. 2 and 3 pertain to a plant for producing phosphoric acid in two steps.

The first steps does essentially correspond to the single-step process, as described hereinabove and shown in FIG. 1.

During the subsequent second step, substantially all the calcium sulphate produced during the first step is subjected to a treatment under the following reaction conditions:
- a temperature lying between 30° and 105° C., notably from 30° to 90° C.,
- a phosphoric acid with a $P_2O_5$ concentration lying between 15 and 38%,
- a sulfuric acid concentration lying between 4 and 25%, for example 6 and 20%,
- a solid content lying between 20 and 62%, and
- residence or reaction time between 1 and 18 hours, said reaction conditions being so selected and combined within such limits as to have the II-anhydrite content lie between 0 and 95%, notably 5 to 35% of the resulting calcium sulphate.

The first step in a two-step process may differ relative to a single-step process due to part at least and preferably all the mixture being filtered, the other possible part being fed directly to the second step through lines 32.

As in the first step or the single-step process, the second step also comprises a plurality of tanks 1 to n+1, partitioned or not, which are connected together, a cooler evaporator 20 and a pump 29 feeding the mixture collected in tank n+1, to filter 30.

As it appears more clearly from FIG. 3, but tanks 2 to n are connected in series in a closed circuit, tank 1 communicating only with tank 2.

A filter 7 is cut-in between said two steps.

The calcium sulphate cake resulting from filtering in filter 7, is fed through line 31 into tank 1 where the re-pulping is performed with re-cycled acids or washing waters 36 and/or sulfuric acid 11.

Contrary to what occurs for tanks 2 to n, tank 1 is not crossed by the general mixture circulation. This allows retaining inside tank 1 a $P_2O_5$ content lower than the one present inside tanks 2 to n. When required, said $P_2O_5$ lowering may be balanced partly at least by a sulfuric acid addition, for example for treating relatively hard phosphates.

The design and the working principle for tanks 2 to n are identical to tanks 1 to n+1 in the first step and the one-step plant as shown in FIG. 1.

The conditions for treating the filter cake retained on filter 7 vary according to the nature, the analysis of the phosphates being treated and the intended valorization object for the calcium sulphate.

Thus generally when a phosphate is available at a competing cost and with a possibility for valorizing or discharging a calcium sulphate which is relatively laden with $P_2O_5$, there is worked during the second step, under the following reaction conditions:
- a temperature lying between 60° and 90° C., preferably from 75° to 80° C.,
- a phosphoric acid with a $P_2O_5$ concentration lying between 26 and 38%, preferably from 29 to 35%,
- a sulfuric acid concentration lying between 6 and 20%, preferably 10 to 15%,
- a solid content lying between 20 and 34%, preferably 24 to 30%, and
- a residence or reaction time between 1 and 4 hours, preferably from 2 to 3 hours, said reaction conditions being so selected and combined within said limits as to have the calcium sulphate comprise essentially α-hemihydrate and a II-anhydrite content lying between 5 and 30%, preferably from 10 to 30% of that calcium sulphate being produced.

Part of the mixture thus containing essentially α-hemihydrate and II-anhydrite is fed to tank n+1 to be then forced by pump 29 through line 39 to filter 30 where the liquid phase is separated and returned through lines 12 and 37, to filter 7 and the first tanks from the first step.

The resulting filter cake is then washed with water as shown by arrow 41, and the washing water is also fed through lines 33 and 35, to filter 7 and the first tanks from the first step.

As in the first step, the mixture base flow rate does correspond to the mass of those products obtained from the reactants being fed to the various reaction zones per time unit.

When it is desired to associate the production of concentrated phosphoric acid to obtaining a very high $P_2O_5$ throughput, in the range from 98 to 99%, with a quality-grade calcium sulphate which may economically be made saleable by simple operations of washing, grading, neutralizing and drying, the α-hemihydrate and II-anhydrite separated after the first step, are crystallized during the second step, back to a dihydrate and II-anhydrite mixture.

The conditions for the converting to dihydrate and II-anhydrite vary depending on the nature and the analysis of the phosphates being treated and may generally be defined as follows:
- a temperature lying between 30° and 60° C., preferably from 40° to 45° C.,
- a phosphoric acid with a $P_2O_5$ concentration lying between 15 and 25%, preferably from 17 to 20%,
- a sulfuric acid concentration lying between 8 and 18%, preferably from 12 to 15%,
- a solid content lying between 32 and 62%, preferably from 45 to 58%, and
- a reaction or residence time lying between 3 and 18 hours, preferably from 6 to 12 hours, said reaction conditions being so selected and combined within said limits as to have the calcium sulphate comprise essentially dihydrate and a II-anhydrite content lying between 5 and 30%, preferably from 5 to 20% of the calcium sulphate being produced.

The α-hemihydrate crystallizes in the hexagonal system and advantageously contains on dry basis at 250° C., from 5.8 to 6.1% crystal $H_2O$, while the II-anhydrite crystallizes in the orthorhombic system and advantageously contains on dry basis at 250° C., from 0.2 to 0.6% crystal $H_2O$, as production calcium sulphate, or as calcium sulphate being separated at the end of the first step.

The calcium sulphate being produced at the end of the second step is essentially either α-hemihydrate and II-anhydrite which advantageously contains on dry basis at 250° C., from 4 to 6% crystal $H_2O$, or dihydrate crystallized in the prismatic monoclinic system and II-anhydrite which advantageously contains on dry basis at 250° C., from 17 to 19.5% crystal $H_2O$.

The granulometry of that calcium phosphate being fed to the tanks from the first step or the single-step process is smaller than 0.5 mm and 65% from the grains are preferably smaller than or equal to 0.150 mm.

In the single-step process or in the first step of the two-step process, when the use being contemplated for the phosphoric acid does so require, it is possible to adjust the $SO_4^{--}$ content to a higher level by adding sulfuric acid to the mixture before filtering.

Said operation preferably occurs inside a separate tank not shown in the figures, and when required said tank is provided with a cooling device to avoid heating which might change the crystallizing of the calcium sulphate by increasing the II-anhydrite proportion.

The experience shows that said additional operation allows obtaining a mixture of α-hemihydrate and II-anhydrite which is easily filtered and washed.

When the balance in the contents in fluorine, activated silica and/or alumina is not satisfactory, it is naturally possible to correct the possible unbalances by adding activated silica and/or alumina, and possibly also by mixing other suitably-selected phosphates.

This may be of importance to control the shape and the size of the calcium sulphate crystals obtained in the filter cakes.

Such techniques are quite conventional and have been described by Richard L. GILBERT Jr in Industrial and Engineering Chemistry Process Design and Development vol. 5, No. 4, pages 388 to 391, October 1966.

The use of circulating devices 14 and 23 with varying flow rates allows to obtain, mostly in large units, any flow rate combination wherein the circulation in the evaporator 20 is higher than or equal to the general circulation flow rate within the proposed respective limits from 2000 to 4000% and from 300 to 4000%.

The flow rate of the circulating devices 23 is the difference between the flow rate through evaporator 20 and the flow rate of the circulating devices 14 for cycling back the general circulation.

This thus allows obtaining inside the evaporator, all the required flow rates, independently from the flow rate being selected for the general circulation.

FIGS. 4 and 5 pertain to a third embodiment of the process according to the invention.

This embodiment lies mostly in allowing to feed the calcium phosphate into the mixture directly in moist condition, which may thus comprise a non-neglectible energy saving as a prior drying is thus avoided.

In a first case, the process relates to the preparation of phosphoric acid having a $P_2O_5$ concentration lower than or equal to 40%, generally in the range from 35 to 38% $P_2O_5$.

The calcium sulphate which is being produced in a first step, is present in this case essentially in dihydrate form.

When in a second case, there is produced a phosphoric acid the $P_2O_5$ titre of which is higher than 40%, the resulting calcium sulphate lies essentially in α-hemihydrate form with a slight II-anhydrite content.

According to the invention, it has been noticed that a strict control of the variations in $Ca^{++}$ and $SO_4^{--}$ concentrations and temperature changes in the reaction zones is of very great importance both for the efficiency and for the acid titre and quality of calcium sulphate as by-product.

Advantageously such control is performed by retaining in a first part of said reaction zones, wherein tricalcic phosphate is fed, a temperature which lies between 75° and 85° C., preferably between 78° and 82° C., and a phosphoric acid concentration between 0.25 and 0.85%, to perform the substantially complete attack of said tricalcic sulphate by the phosphoric and sulfuric acids which are present in the reaction medium. At this level, a maximum amount $Ca^{++}$ ions are solubilized.

In a second subsequent part of said reaction zones communicating with the first part zones, the crystallizing phase stabilisation is adjusted by a high solubilizing of $P_2O_5$ combined with $Ca^{++}$ ions in the form of $HPO_4^{--}$ or $H_2PO_4^{-}$ ions.

At this moment, the solubility of said $Ca^{--}$ ions lies between 0.02 and 0.08%, due to the raising of $SO_4^{--}$ ion concentration to higher limits lying between 1 and 2.5%, and a temperature lying between 65° and 75° C., and the liquid phase has all those qualities of the production phosphoric acid.

According to a particular embodiment of the invention, there is retained in said reaction zones, a solid content lying between 15 and 45% (computed by weight on dry material at 250° C.), preferably between 20 and 45%, and a residence or reaction time in said zones lying between 1 and 7 hours, preferably between 2 and 5 hours.

In a preferred embodiment, the reaction zones from each both said parts are connected together in a closed circuit, and comprise at least one cooling zone.

With reference to the first and second embodiments, as shown in FIGS. 1 to 3, it might be shown that both said parts of the reaction zones comprise the reaction zones of a single-step process as shown in FIG. 1, or the reaction zones from the first step of the two-step process as shown in FIGS. 2 and 3.

FIGS. 4 and 5 pertain more particularly to a process wherein there is worked in two succeeding separate steps.

Thus the first step comprises both said parts of the reaction zones and a separation, preferably by filtering, of a portion at least of the resulting calcium sulphate, after the reaction zones of said second part.

During a second subsequent step, part at least of said separated phosphate is pulped back and substantially all the calcium sulphate being produced during said first step is subjected to a treatment under such conditions that the calcium sulphate will be in one or a plurality of predetermined crystalline forms, said sulphate being in turn subjected to a separating operation, preferably a filtering, and a washing.

As in the first step, this subsequent treatment is advantageously performed during the second step, in a series of succeeding reaction zones comprising a cooling zone.

As in the second step, the object is to obtain a calcium sulphate as by-product, with a well-determined nature, the reaction conditions are generally adjusted within more narrow limits than in the first step.

In actual practice, six different cases may occur.

For the first two cases, the parameters are adjusted during the second step, in such as way as to retain the unchanged crystallizing of the calcium sulphate being separated at the end of the first step.

Consequently, when during the first step, the reaction conditions are so retained as to produce α-hemihydrate, during the second step the parameters are so adjusted as to retain said hemihydrate, which contains possibly a few percents II-anhydrite. In a similar way when during the first step, dihydrate is being formed, the reaction parameters are so adjusted during the second step as to retain essentially dihydrate which contains possibly a few percents II-anhydrite.

In the four other cases, the parameters are so adjusted during the second step as to convert the resulting calcium sulphate after the first step, into another crystalline form.

Thus when α-hemihydrate is formed during the first step, the reaction conditions during the second step are so adjusted as to obtain either essentially dihydrate containing a slight percentage II-anhydrite, or essentially II-anhydrite.

When on the other hand, dihydrate is being formed during the first step, the reaction conditions may possibly be so adjusted during the second step as to form essentially either α-hemihydrate containing a slight percentage II-anhydrite, or essentially II-anhydrite.

In both first cases, that is when the crystallizings remain unchanged during the second step, there is obtained a throughput in the range from 94.5 to 96.5%, while when during the second step, there is performed a re-crystallizing of that calcium sulphate obtained during the first step, the resulting throughput is generally higher than 98%.

Generally when there is available a phosphate with a competing price and a possibility to valorize and discharge a calcium sulphate which is relatively laden with $P_2O_5$, one works within the reaction conditions of both first cases, said conditions may more particularly be as follows:

- a temperature lying between 70° and 85° C., preferably from 75° to 80° C.,
- a phosphoric acid with a $P_2O_5$ concentration lying between 15 and 25%, preferably from 17 to 20%,
- a sulfuric acid concentration lying between 5 and 15%, preferably from 8 to 12%,
- a solid content lying between 20 and 45%, preferably from 25 to 35%, and
- a residence or reaction time lying between 0.5 and 3 hours, preferably 1 to 1.5 hours.

Such conditions are advantageously so selected and combined within said limits as to have the calcium sulphate essentially contain dihydrate and with a II-anhydrite content lying between 0 and 15%, preferably 0 to 5%, of the resulting calcium sulphate.

When it is desired to associate the production of concentrated phosphoric acid to the obtaining of a very high $P_2O_5$ throughput, in the range from 98 to 99%, with a quality calcium sulphate which may unexpensively be made saleable by simple operations of washing, grading, neutralizing and drying, the calcium sulphate being obtained during the first step is subjected to a re-crystallizing during the second step.

More particularly when during the first step, dihydrate is essentially obtained, one works during the second step under the following reaction conditions, depending on the nature and chemical composition of the phosphates being treated:

- a temperature lying between 85° and 95° C. to form α-hemihydrate, and a temperature lying between 65° and 75° C. to form II-anhydrite,
- a phosphoric acid with a $P_2O_5$ concentration lying between 19 and 28% to form α-hemihydrate, and lying between 15 and 18% to form II-anhydrite,
- A sulfuric acid concentration lying between 6 and 15% to form α-hemihydrate, and from 15 to 25%, preferably from 15 to 20% to form II-anhydrite,
- a solid content lying between 20 and 45%, preferably 25 to 35%, and
- a reaction or residence time lying between 0.5 and 3 hours, preferably 1 to 1.5 hours.

Such reaction conditions are so selected and combined within said limits, as to have said calcium sulphate essentially comprise either α-hemihydrate, or II-anhydrite, or a α-hemihydrate with a II-anhydrite content lying between 5 and 20%, preferably 5 to 15% of the resulting calcium sulphate.

The pulping back of calcium sulphate during the second step, is preferably performed in a separate reaction zone provided upstream of a series other reaction zones connected together in a closed circuit, so as to retain in said re-pulping zone, a lower $P_2O_5$ content than in the other zones.

When required, such $P_2O_5$ lowering is balanced partly at least, by adding sulfuric acid, for example, to treat relatively hard phosphates.

It has been noticed according to the invention, that a very efficient and strict control of the reaction conditions and more particularly of the above-defined parameters, may be obtained by adjusting at least in each one of said first and second reaction zone parts, the circulating mixture flow rate relative to a mixture base flow rate, which corresponds to the flow rate being discharged from the reaction zones, according to the same specifications as defined regarding both first embodiments.

When the process according to the invention comprises two steps, in a similar way, the flow rates in the reaction zones of said second step are also adjusted substantially as for the reaction zones of both said parts, which are thus part of the first step.

Each step has for feature that it ends with an at least part separation of the resulting calcium sulphate, such separation preferably occurring through filtering.

On the other hand in each step, the circulation zones are determined by a sequence of tanks, partitioned or not, connected in series in a closed circuit.

Consequently the first part Ia from first step I comprises 1 to n tanks, n being determined as a function of the nature of the sulphate to be treated, the capacity of the plant and of the tanks proper.

It has generally been noticed that very favourable results are already obtained when the first part comprises 2 to 3 tanks.

In a similar way, the second part Ib from the first step also comprises a series of tanks 1 to n, partitioned or not and connected in series in a closed circuit, n may also vary depending on the plant type and the phosphate to be treated. As for the first part, it has been noticed that favourable results are obtained when n=2 or 3.

Both said parts Ia and Ib are connected together as shown by arrow 45, and they have at the most a re-circulation from 10 to 15% from part Ia to part Ib, but preferably no such re-circulation.

The second step II is also comprised of a series of tanks 1 to n, partitioned or not and connected in series, n being dependent on the plant characteristics and the nature of the phosphate to be treated.

The number of tanks, that is "n", may be identical or different in parts Ia and Ib and in second step II.

Very satisfactory results have been obtained when n—2 or 3 in said second step II.

The second step of said third embodiment may be identical to the second step in the second embodiment as shown in FIGS. 2 and 3, in such a way that reference should be made for the description and operation of said second step, to FIGS. 2 and 3 and the corresponding description thereof.

The first step I has thus for feature that it comprises two parts Ia and Ib each formed by a series of tanks connected in series in closed circuits as shown diagrammatically by dot-and-dash lines 46, 47 respectively.

In part Ia there is advantageously retained a temperature lying between 75° and 85° C., and a sulfuric acid concentration between 0.25 and 0.85%, while in second part Ib, the temperature is retained between 65° and 75° C. with a sulfuric acid concentration lying between 1 and 2.5%.

On the other hand, at the most 10% and preferably 0% as in the embodiment shown in FIGS. 4 and 5, of that mixture leaving the second part Ib of said reaction zones, is cycled back to the first part Ia.

As already stated hereinabove, the conditions for treating the filter cake retained on filter 7 vary depending on the nature, the chemical composition of the phosphates being treated, and the contemplated valorizing object for the resulting calcium sulphate.

Thus all of the calcium sulphate originating from the second part Ib of the first step is subjected during the second subsequent step, to a treatment under the following generally reaction conditions:
- a temperature lying between 30° and 150° C., for example from 60° to 105° C.,
- a $P_2O_5$ concentration lying between 15 and 38%, for example from 15 to 28%,
- a sulfuric acid concentration lying between 4 and 25%,
- a solid content lying between 20 and 62%, for example from 20 to 45%, and
- a residence or reaction time lying between 0.5 and 18 hours, notably from 0.5 to 3 hours.

The accurate selection of the various parameters within the above-defined reaction condition limits may generally be determined by experiment as a function of the nature of the phosphate being used and the resulting calcium sulphate.

The alpha-hemihydrate crystallizes in the hexagonal system and advantageously contains on dry basis at 250° C., from 5.8 to 6.1% crystal $H_2O$, the II-anhydrite crystallizes in the orthorhombic system and advantageously contains on dry basis at 250° C., from 0.2 to 0.6% crystal $H_2O$, while the dihydrate crystallizes in the monoclinic prismatic system and advantageously contains on dry basis at 250° C., from 19.8 to 20.2% crystal $H_2O$.

The resulting calcium sulphate at the end of the second step is essentially either alpha-hemihydrate and II-anhydrite which advantageously contains on dry basis at 250° C., from 4 to 6.1% crystal $H_2O$, or dihydrate and II-anhydrite which advantageously contains on dry basis at 250° C., from 17 to 20.2% crystal $H_2O$, or II-anhydrite.

Advantageously, the granulometry of at least 95% of that calcium sulphate being fed to the tanks in the first step is smaller than 0.5 mm and 60 to 70% of the grains are preferably smaller than or equal to 0.150 mm.

When the balance of the contents in fluorine, activated silica and alumina from the phosphate being treated is not satisfactory, it is naturally possible to correct the possible unbalances by adding activated silica and/or alumina, and also by mixing other suitably-selected phosphates.

This may be of importance to control the shape and size of the calcium sulphate crystals obtained in the filter cakes.

Such techniques are completely conventional and have been described by Richard L. Gilbert Jr. in Industrial and Engineering Chemistry Process Design and Development, vol. 5, No. 4, pages 388 to 391, October 1966.

Advantageously, it has been noticed according to the invention, that such an addition of activated silica and/or alumina should occur in the one reaction zone wherein the calcium phosphate to be treated is fed, or in one or a plurality of zones adjacent thereto, that is completely at the start of the first step, or when same does comprise both parts Ia and Ib, at the start of part Ia.

Finally some actual examples are given hereinafter of the process according to the invention as applied in plants such as shown in the accompanying figures.

EXAMPLE 1

Marocco phosphate 70–72 BPL and 98%-concentrated sulfuric acid have been fed to the first tanks in the plant as shown in FIG. 1, or to the first step in the plant as shown in FIGS. 2 and 3.

The solid content in said tanks has been controlled by re-cycling production phosphoric acid as shown by line 4, while the $P_2O_5$ titre of the liquid phase has been retained by cycling filtrates originating from filters 7 and 30 back through lines 12, 15 and 33. The amount reactants being added and cycled back was such as to retain a base flow rate of 12 m³/t resulting $P^2O_5$ for a 3-hour stay in the reaction volume, with a general circulation and an evaporator circulation both adjusted to 4000%. The reaction conditions in the first step tanks were as follows: temperature 72° C., solid content in the reaction mixture: 24%; $P_2O_5$ content in the liquid phase: 43%; $H_2SO_4$ content in the liquid phase: 1.2%. The calcium sulphate precipitated as α-hemihydrate and II-anhydrite, the $CaSO_4$ content was 5% of the total amount calcium sulphate.

The resulting macled crystals had a good filterability with an attack efficiency of 96.5%, and the solids formed by α-hemihydrate and II-anhydrite did contain about 6% crystal water, and 1.6% total $P_2O_5$ in the solid phase, computed on dry basis at 250° C.

In a first test performed in a plant as shown in FIG. 1, all that mixture drawn from the circuit and thus corresponding to the base rate flow, has been filtered and after washing with water, it was discharged. The resulting filter cake did contain 1.8% total $P_2O_5$ with a moisture content of 31% on the basis of a product dried at 250° C.

In a second test, 80% of the mixture base flow rate has been lead to filter 7 in said plant.

The filter cake thus comprised of α-hemihydrate and II-anhydrite has been pulped back in tank 1 from the second step, with liquids originating from filter 30 and the remaining 20% mixture.

In the tanks from the second step, the conditions for temperature, $H_2SO_4$ concentration and $P_2O_5$ concentration are succeedingly adjusted to obtain α-hemihydrate and II-anhydrite to the rate of 20% total calcium sulphate.

Thus the temperature has been retained to 68° C. by cooling. The solid content has been returned to 26% by re-cycling liquids from filter 30, the $P_2O_5$ content has been retained to 32% of the phosphoric acid, and the free sulfuric acid content has been retained to 15%.

The base flow rate was 11 m³ with a 3-hour stay in the reaction volume, a general circulation of 2500%, and an evaporator circulation adjusted to 4000%. The filter cake containing α-hemihydrate and II-anhydrite discharged at filter 30 contained 0.65% $P_2O_5$ and 4.6% crystal $H_2O$, on the basis of dried product at 250° C., the moisture content of the filter cake being 28%.

Finally in a third test, all the mixture base flow rate originating from the first step has been lead to filter 7 and the resulting α-hemihydrate and II-anhydrite has been converted during the second step, to dihydrate and II-anhydrite (10% total calcium sulphate) by lowering the temperature to 45° C.

The other operating conditions were as follows: solid content in the mixture: 48%; $P_2O_5$ content: 17%, and $H_2SO_4$ content: 13%. The base flow rate was 5.5 m³ with a residence time in the reaction zones of 12 hours, a general circulation of 2500%, and an evaporator circulation adjusted to 3500%. The filter cake discharged at filter 30 was essentially comprised of dihydrate and II-anhydrite containing 0.35% $P_2O_5$, 17.6% crystal $H_2O$ (on the basis of a dry product at 250° C.), and a moisture content of 32%.

EXAMPLE 2

Florida phosphate 70–72 BPL has been fed in the tanks from the first step together with 98%-concentrated sulfuric acid. The solid content inside said tanks and the $P_2O_5$ titre of the liquid phase have been retained as for example 1. The base flow rate was 12.5 m³/t resulting $P_2O_5$ with a residence time of 4 hours in the reaction zones, a general circulation of 2500%, and an evaporator circulation adjusted to 4000%.

The reaction conditions in the various tanks from this first step were as follows: temperature 78° C.; solid content in the mixture: 23%; $P_2O_5$ content in the liquid phase: 45%; $H_2SO_4$ in the liquid phase: 1.5%. The calcium sulphate being precipitated as α-hemihydrate and II-anhydrite (forming 7% total calcium sulphate) did lie in the form of macled crystals with a good filterability. The attach efficiency was 96.5%, and the filter cake contained about 6% crystal $H_2O$, and 1.5% total $P_2O_5$ in the solid phase, computed on dry basis at 250° C.

In a first test, all the mixture base flow rate has been filtered and the washed and discharged cake contained 1.9% total $P_2O_5$, with a moisture content of 27.4%. This first test has been performed in a plant of that type shown in FIG. 1.

In a second test, performed in a plant as shown in FIG. 2, 80% of the mixture base flow rate has been lead to filter 7, and the filter cake comprised of α-hemihydrate and II-anhydrite, has been pulped back with liquids originating from filter 30 and the remaining 20% mixture from the base flow rate.

The reaction conditions have been adjusted in the second step to obtain α-hemihydrate with II-anhydrite to the rate of 25% of the total calcium sulphate.

Thus the temperature has been retained to 72° C. by cooling. The solid content in the mixture has been returned to 24% by cycling back liquids originating from filter 30. The $P_2O_5$ content was 34%, and the free $H_2SO_4$ content was 15%. The base flow rate in the second step was 12 m³ with a residence time of 2.5 hours in the reaction zones, a general circulation of 2500%, and an evaporator circulation adjusted to 4000%. The cake of hemihydrate and II-anhydrite discharged at filter 30 contained 0.80% $P_2O_5$ with 4.2% crystal $H_2O$ (on the basis of dry product at 250° C.), the moisture content of the cake being 28%.

In a third test also performed in a plant as shown in FIG. 2, all of the mixture base flow rate from the first step has been fed to filter 7, and the resulting filter cake has been converted to dihydrate and II-anhydrite, said latter anhydrite forming 10% of the total calcium sulphate, by lowering the temperature to 45° C. The other reaction conditions were as follows: solid content in the mixture 45%, and in the liquid phase, $P_2O_5$ content 15% and $H_2SO_4$ content 17%. The base flow rate was 6 m³ with a residence time of 10 hours in the reaction zones, a general circulation of 2500%, and an evaporator circulation adjusted to 3500%. The filter cake essentially comprised of dihydrate and II-anhydrite discharged at filter 7 contained 0.33% $P_2O_5$ and 17.8% crystal $H_2O$ (on the basis of dried product at 250° C.), the cake moisture content was 33.4%.

EXAMPLE 3

A mixture of Kola-Marocco phosphates with relative proportions 70/30 have been fed to the first tanks in the plant as shown in FIG. 1, and to the first tank in the first step of the plant as shown in FIG. 2.

The operating conditions were as follows: base flow rate 10 m³/t resulting $P_2O_5$ with a stay time in the reaction zones of 3 hours, a general circulation of 500%, and an evaporator circulation of 4000%, a temperature of 72° C., a $P_2O_5$ content in the liquid phase of 43.5%, an $H_2SO_4$ content in the liquid phase of 1.5%. The calcium sulphate precipitated in the form of α-hemihydrate and II-anhydrite (forming about 8% of the calcium sulphate). Said sulphate was present in the form of macled crystals with a good filterability. The attack efficiency was 97% and the solid α-hemihydrate and II-anhydrite contained about 5.9% crystal $H_2O$ and 1.2% total $P_2O_5$ in the solid phase, as computed on a dried product at 250° C.

In a first test performed in a plant as shown in FIG. 1, all the base flow rate of the mixture has been filtered and after washing, a cake of α-hemihydrate and II-anhydrite was obtained which did contain 1.6% $P_2O_5$ with 29% moisture.

In a second test performed in a plant as shown in FIG. 2, all the mixture being drawn from the first step has been filtered and in the second step, the cake has been pulped back in the suitable conditions to obtain α-hemihydrate and II-anhydrite forming 15% of the total calcium sulphate.

Thus the temperature was 65° C. The solid content was 24%, the $P_2O_5$ content as 30%, and the free $H_2SO_4$ content was 15%. The base flow rate in said second step was 11 m³ with a residence time of 2.5 hours in the reaction zones, a general circulation of 1500%, and an evaporator circulation adjusted to 4000%. The α-hemihydrate and II-anhydrite cake discharged from the filter contained 0.75% $P_2O_5$ and 5.2% crystal $H_2O$ (on the basis of dried product at 250° C.), the cake moisture content was 26%.

In a third test also performed in a plant as shown in FIG. 2, all the base flow rate of the mixture originating from the first step has been lead to filter 7. The α-hemihydrate and II-anhydrite resulting cake has been converted thereafter into dihydrate and II-anhydrite (to the rate of 15% total calcium sulphate) by lowering the temperature to 45° C. The other operating conditions were as follows: solid content in the mixture: 50%, $P_2O_5$ content in the liquid phase 19%, and $H_2SO_4$ content 9%. The base flow rate was 5 m³ with a residence time of 12 hours in the reaction zones, a general circulation of 2500%, and an evaporator circulation adjusted to 4000%.

The cake comprised of dihydrate and II-anhydrite, discharged from the filter, contained 0.30% $P_2O_5$ and 17% crystal $H_2O$ (on the basis of the dried product at 250° C.), the cake moisture content was 35%.

EXAMPLE 4

Marocco phosphate 70–72 BPL and 98%-concentrated sulfuric acid have been fed to the first tanks from the first step of the plant as shown in the figures.

The solid content inside said tanks has been controlled by cycling back production phosphoric acid, as shown by line 4, while the $P_2O_5$ titre of the liquid phase has been retained by cycling back filtrates originating from filters 7 and 30 through lines 12, 15 and 33.

The amount reactants being added and cycled back was such as to retain a base flow rate of 10 m$^3$/t resulting $P_2O_5$ for a residence time of 3 hours in the reaction volume, with a general circulation and an evaporator circulation both adjusted to 4000%. The reaction conditions in the tanks from the first step were as follows: temperature 82° C. in the first part Ia and 72° C. in the second part Ib; solid content in the reaction mixture: 34%; $P_2O_5$ content in the liquid phase: 36%; $H_2SO_4$ content in the liquid phase: 0.3% in the first part Ia and 1.2% in the second part Ib.

The calcium sulphate precipitated in dihydrate form. The macled crystals had a good filterability with an attack efficiently of 96.5%, and the solids comprised of dihydrate contained about 20% crystal water and 1.6% total $P_2O_5$ in the solid phase, computed on dry basis at 250° C.

In a first test, the mixture base flow rate has been lead to filter 7 in said plant.

The filter cake thus comprised of dihydrate has been pulped back in tank 1 from the second step with liquids originating from filter 30. In the tanks from the second step, the conditions for temperature, $H_2SO_4$ concentration and $P_2O_5$ concentration are succeedingly adjusted to obtain alpha-hemihydrate and II-anhydrite to the rate of 5% of total calcium sulphate.

Thus the temperature has been retained at 90° C. by injecting steam, the solid content has been lowered to 30% by cycling back liquids from filter 30, the $P_2O_5$ content has been retained to 24% in the phosphoric acid, and the free sulfuric acid content has been retained to 12%.

The base flow rate in the second step was 9 m$^3$ with a residence time of 1 hour in the reaction volume and a general circulation of 2500%. The filter cake containing the alphhemihydrate and II-anhydrite discharged from filter 30 contained 0.30% $P_2O_5$ and 5.6% crystal $H_2O$ on the basis of the dried product at 250° C., the cake moisture content being 18%.

Finally in a second test, all the base flow rate of the mixture originating from the first step has been lead to filter 7 and the resulting dihydrate cake has been re-treated in the second step, into dihydrate by changing the temperature to 75° C. and with phosphoric and sulfuric acidities of the liquids.

The operating conditions were as follows: solid content in the mixture: 38%; $P_2O_5$ content: 17%, and $H_2SO_4$ content: 10%. The base flow rate was 6.5 m$^3$ with a residence time in the reaction zones of 1.5 hours, a general circulation of 2500%, and an eveporator circulation adjusted to 3500%. The filter cake discharged from filter 30 was essentially comprised of dihydrate containing 0.95% $P_2O_5$, 19.6% crystal $H_2O$ (on the basis of dried product at 250° C.), and the moisture content was 34%.

EXAMPLE 5

Florida phosphate 70–72 BPL has been fed to the tanks in the first step of the plant as shown in FIGS. 4 and 5, together with 98%-concentrated sulfuric acid. The solid content in said tanks and the $P_2O_5$ titre were 11 m$^3$/t resulting $P_2O_5$ with a residence time of 3.5 hours in the reaction zones, a general circulation of 2500%, and an evaporator circulation adjusted to 4000%.

The reaction conditions in the various tanks of said first step were as follows: temperature: 78° C. in the first part Ia and 70° C. in the second part Ib; solid content in the mixture: 33%; $P_2O_5$ content in the liquid phase: 38%; $H_2SO_4$ content in the liquid phase: 0.5% in the first part Ia and 1.5% in the second part Ib. The calcium sulphate precipitated in dihydrate form was present as macled crystals with a good filterability. The attack efficiency was 99.5%, and the filter cake contained about 20% crystal $H_2O$ and 1.5% total $P_2O_5$ in the solid phase, computed on dry basis at 250° C.

In a first test, all the base flow rate of the mixture has been filtered and the cake was washed with filtrates No. 35 and 37 and discharged. Said cake had a moisture content of 40%.

The resulting cake has been re-treated in the second step, into dihydrate at a temperature of 80° C., a solid content in the mixture of 34%, $P_2O_5$ content: 20%, and $H_2SO_4$ content: 8%. The base flow rate was 8 m$^3$ with a residence time in the reaction zones of 1.5 hours, a general circulation of 2500%, and an evaporator circulation adjusted to 3000%.

The filter cake discharged from filter 30 was comprised of dihydrate containing 1.1% $P_2O_5$, 19.8% crystal $H_2O$ (on the basis of a dried product at 250° C.), and a moisture content of 36%.

In a second test performed in the same plant, 100% of the mixture base flow rate has been fed to filter 7 and the filter cake comprised of dihydrate, has been pulped back with liquids originating from filter 30.

The reaction conditions have been adjusted in the second step to obtain α-hemihydrate with II-anhydrite to the rate of 5% of total calcium sulphate.

Thus the temperature has been retained to 92° C. by injecting steam 50. The solid content in the mixture has been lowered to 28% by cycling back liquids originating from filter 30. The $P_2O_5$ content was 22% and the free $H_2SO_4$ content was 10%. The base flow rate in the second step was 10% was a residence time of 1.0 hour in the reaction zones, and a general circulation of 2500%. The cake from hemihydrate and II-anhydrite discharged from filter 30 contained 0.35% $P_2O_5$ with 5.8% crystal $H_2O$ (on the basis of dried product at 250° C.), the moisture content of the cake being 20%.

In a third test also performed in a plant as shown in the figures, all the base flow rate of the mixture from the first step has been lead to filter 7, and the resulting filter cake has been converted into II-anhydrite by lowering the temperature to 55° C., said latter anhydrite forming 95% of the total calcium sulphate, the remaining 5% being dihydrate. The other reaction conditions were as follows: a solid content in the mixture of 40%, and in the liquid phase, a $P_2O_5$ content of 15% and a $H_2SO_4$ content of 25%. The base flow rate was 6 m$^3$ with a residence time of 1 hour in the reaction zones, a general circulation of 2500%, and an evaporator circulation adjusted to 3500%. The filter cake essentially comprised of II-anhydrite and discharged from the filter, contained 0.38% $P_2O_5$ and 0.7% crystal $H_2O$ (on the basis of dried product at 250° C.), the cake moisture content being 40%.

EXAMPLE 6

A Kola-Marocco phosphate mixture with respective proportions 70/30, has been fed to the first tank from the first step of the plant as shown in FIGS. 4 and 5.

The operating conditions were as follows: base flow rate of 10 m³/t production $P_2O_5$ with a residence time in the reaction zones of 3.5 hours, a general circulation of 500%, and an evaporator circulation of 4000%, a temperature of 80° C. in part Ia and 72° C. in part Ib; a $H_2SO_4$ content in the liquid phase of 0.4% in the first part Ia and 1.5% in the second part Ib. The calcium sulphate precipitated in dihydrate form. Said sulphate was present in macled crystal form with a good filterability. The attack efficiency was 97%, and the dihydrate solids contained about 19% crystal $H_2O$ and 1.0% total $P_2O_5$ in the solid phase, computed on dried product at 250° C.

In a first test performed in a plant as shown in FIGS. 4 and 5, all the mixture drawn from the first step has been filtered, and in the second step the cake has been pulped back under such conditions as to obtain α-hemihydrate and II-anhydrite forming 5% of the total calcium sulphate.

Thus the temperature was 95° C., the solid content was 30%, and the free $H_2SO_4$ content was 15%. The base flow rate in said second step was 9 m³ with a residence time of 1.0 hour in the reaction zones, and a general circulation of 1500%. The cake from α-hemihydrate and II-anhydrite discharged from the filter contained 0.28% $P_2O_5$ and 5.8% crystal $H_2O$ (on the basis of the dried product at 250° C.), the cake moisture content being 18.5%.

In a second test also performed in a plant as shown in FIGS. 4 and 5, all the base flow rate of the mixture originating from the first step has been lead to filter 7. The resulting dihydrate cake has then been treated back to dihydrate at a temperature of 68° C. The other operating conditions were as follows: solid content in the mixture: 38%; in the liquid phase, $P_2O_5$ content 19% and $H_2SO_4$ content 9%. The base flow rate was 9 m³ with a residence time of 1.2 hours in the reaction zones, a general circulation of 2500% and an evaporator circulation adjusted to 4000%.

The cake comprised of dihydrate and II-anhydrite (3% of the calcium sulphate discharged from the filter) contained 0.85% $P_2O_5$ and 18% crystal $H_2O$ (on the basis of the dried product at 250° C.), the cake moisture content being 35%.

EXAMPLE 7

Marocco phosphate 70–72 BPL and 98%-concentrated sulfuric acid have been fed to the first tanks from the first step in the plant as shown in FIGS. 4 and 5.

The solid content inside said tanks has been controlled by cycling back production phosphoric acid, as shown by line 4, while the $P_2O_5$ titre in the liquid phase has been retained by cycling back filtrates originating from filters 7 and 30 through lines 12, 15 and 33.

The amount reactants being added and cycled back was such as to retain a base flow rate of 12 m³/t resulting $P_2O_5$ for a residence time of 3 hours in the reaction volume, with a general flow rate and an evaporator flow rate both adjusted to 4000%. The reaction conditions inside the tanks from the first step were as follows: temperature: 82° C. in part Ia and 72° C. in part Ib; solid content in the reaction mixture: 24%; $P_2O_5$ content in the liquid phase: 43%; $H_2SO_4$ content in the liquid phase: 0.4% in part Ia and 1.2% in part Ib.

The calcium sulphate precipitated in α-hemihydrate and II-anhydrite form, the $CaSO_4$ content being 5% of the total amount calcium sulphate.

The resulting macled crystals had a good filterability with an attack efficiency of 96.5%, and the solids comprised of α-hemihydrate and II-anhydrite contained about 6% crystal water and 1.6% total $P_2O_5$ in the solid phase, computed on dry basis at 250° C.

In a first test, 80% from the mixture base flow rate have been lead to filter 7 in said plant.

The cake filter thus comprised of α-hemihydrate and II-anhydrite has been pulped back inside tank 1 from the second step, with liquids originating from filter 30 and the remaining 20% of the mixture.

Inside the tanks from the second step, the conditions for temperature, $H_2SO_4$ concentration and $P_2O_5$ concentration have succeedingly been adjusted ot obtain α-hemihydrate and II-anhydrite to the rate of 20% of the total calcium sulphate.

Thus the temperature has been retained to 68° C. by cooling. The solid content has been lowered to 26% by cycling back liquids originating from filter 30, the $P_2O_5$ content has been retained to 32% in the phosphoric acid, and the free sulfuric acid content has been retained to 15%.

The base flow rate in the second step was 11 m³ with a residence time of 3 hours in the reaction volume, a general circulation of 2500%, and an evaporator circulation adjusted to 4000%. The filter cake containing the α-hemihydrate and II-anhydrite discharged from filter 30 contained 0.65% $P_2O_5$ and 4.6% crystal $H_2O$ on the basis of dried product at 250° C., the cake moisture content being 28%.

In a second test, all the base flow rate of the mixture originating from the first step has been lead to filter 7, and the resulting cake from α-hemihydrate and II-anhydrite has been converted in the second step, into dihydrate and II-anhydrite (10% total calcium sulphate) by lowering the temperature to 45° C.

The other operating conditions were as follows: solid content in the mixture: 48%; $P_2O_5$ content: 17% and $H_2SO_4$ content: 13%. The base flow rate was 5.5 m³ with a residence time in the reaction zones of 12 hours, a general circulation of 2500%, and an evaporator circulation adjusted to 3500%. The filter cake discharged from filter 30 was essentially comprised of dihydrate and II-anhydrite containing 0.35% $P_2O_5$, 17.6% crystal $H_2O$ (on the basis of dried product at 250° C.), and a moisture content of 32%.

The various tests in the above examples have been performed in a pilot plant with a capacity of 20 kg $P_2O_5$ within 24 hours.

In examples 1 to 3, use is made for the first test, of two reaction tanks, for the second test of two tanks in said first and second steps, and for the third test of two tanks in the first test and four tanks in the second test, while for examples 4 to 7, use is made for the first test of three reaction tanks, for the second test of two tanks in the first and second steps, and for the third test of two tanks in the first step and one tank in the second step.

We claim:

1. A method for preparing phosphoric acid and calcium sulphate containing II-anhydite as a by-product, wherein, in a mixture containing calcium sulphate flowing through a sequence of reaction zones, calcium phosphate is subjected to an attack by a mixture of sulfuric and phosphoric acids, and at least part of the production phosphoric acid is removed, which comprises adjusting the circulating mixture flow rates relative to a mixture base flow rate which corresponds to the flow rate being discharged from the reaction zones, in conformity with the following specifications:

a general circulation through a majority of the reaction zones with a rate lying between 300 and 4000% of the base flow rate, a circulation through a vacuum cooling zone with a rate lying between 2000 and 4000% of said base flow rate, local circulations in the reaction zones with rates each lying between 500 and 2000% of the same base flow rate, the sum of the general circulation and the local circulation being higher than or equal to 2500% of the base flow rate in every zone where reactants are being added, as well as in that zone which directly follows each of said zones in the general circulation circuit, and retaining in a first part of the reaction zones wherein tricalcic phosphate is fed, a temperature lying between 75° and 85° C., and a sulfuric concentration between 0.25 and 0.85%, so as to obtain the substantially complete attack of said tricalcic phosphate, and retaining in a subsequent second part communicating with the first reaction zone part, a temperature lying between 65° and 75° C., and a sulfuric concentration lying between 1 and 2.5%, so as to solubilize $P_2O_5$ combined with $Ca^{++}$ ions, in the form of $HPO_4^{--}$ and/or $H_2PO_4^-$, the reaction conditions being selected and combined within said limits so as to obtain on the one hand a production phosphoric acid having a $P_2O_5$ concentration lying between 33 and 52%, and a $H_2SO_4$ concentration lying between 0.25 and 2.5%, and on the other hand calcium sulphate as by-product, (a) essentially in dihydrate form by re-crystallizing α-hemihydrate or by unchanged crystallizing by selecting and combining within said reaction limits, a temperature within a range lying between 30° and 80° C., a $H_2SO_4$ concentration between 4 and 15% and a $P_2O_5$ concentration between 15 and 20%, (b) essentially in II-anhydrite form by re-crystallizing dihydrate by selecting and combining within said reaction condition limits, a temperature between 30° and 75° C. with a $P_2O_5$ concentration between 15 and 20% and a $H_2SO_4$ concentration between 12 and 15%, or (c) essentially in hemihydrate form either by recrystallizing dihydrate or by an unchanging crystallizing of α-hemihydrate by selecting and combining within said reaction condition limits, a temperature between 75° and 95° C. with a $P_2O_5$ concentration between 22 and 35% and a $H_2SO_4$ concentration between 4 and 15%, the II-anhydrite content lying in the above cases (a) and (c) between 2 and 30% of the production calcium sulphate.

2. The method as defined in claim 1, which comprises operating in a single step comprising said various circulations, under the following reaction conditions:

a temperature within a range lying between 65° and 85° C., a phosphoric acid with a $P_2O_5$ concentration between 36 and 48%, a sulfuric acid concentration within a range lying between 0.25 and 2.5%, a solid content lying within a range between 20 and 38%, and a residence or reaction time between 1 and 17 hours, said reaction conditions being selected and combined within said limits so as to have the calcium sulphate essentially comprise α-hemihydrate and with a II-anhydrite content lying within a range between 2 and 12% of the resulting calcium sulphate.

3. The method as defined in claim 1, which further comprises operating in at least two succeeding steps by subjecting during a first step, in a mixture flowing through a sequence of reaction zones, calcium phosphate to an attack by a mixture of sulfuric and phosphoric acids while removing part at least of the production phosphoric acid and separating calcium sulphate and in a subsequent second step, substantially all the calcium sulphate produced during said step, to a treatment under the following conditions:

a temperature lying between 30° and 105° C., a phosphoric acid with a $P_2O_5$ concentration lying between 15 and 38%, a solid concentration lying between 20 and 62%, and a residence or reaction time between 1 and 18 hours, said reaction conditions being so selected and combined within said limits as to have the II-anhydrite content lying between 2–30% of the resulting calcium sulphate.

4. The method as defined in claim 3, which further comprises operating in the first step, under the following reaction conditions:

a temperature lying within a range between 65° and 85° C., a phosphoric acid with a $P_2O_5$ concentration between 36 and 48% a solid content lying within a range between 20 and 38%, and a residence or reaction time between 2 and 5 hours, said reaction conditions being selected and combined within said limits so as to have the calcium sulphate comprise essentially α-hemihydrate and a II-anhydrite content lying within a range between 2 and 12% of the resulting calcium sulphate.

5. The method as defined in claim 3, which further comprises operating in the second step, under the following reaction conditions:

a temperature lying within a range between 75° to 80° C., a phosphoric acid with a $P_2O_5$ concentration lying within a range between 26 and 38%, a sulfuric acid concentration lying within a range between 6 and 20%, a solid content lying within a range between 20 and 34%, and a residence or reaction time between 1 and 4 hours, said reaction conditions being selected and combined within said limits so as to have the calcium sulphate comprise essentially α-hemihydrate and a II-anhydrite content lying within a range between 5 and 30%, of the resulting calcium sulphate.

6. The method as defined in claim 3, which further comprises operating in the second step, under the following reaction conditions:

a phosphoric acid with a $P_2O_5$ concentration lying within a range between 15 and 25%, a sulfuric acid concentration lying within a range between 8 and 18%, a solid content lying within a range between 32 and 62%, and a reaction or residence time lying within a range between 3 and 18 hours, said reaction conditions being selected and combined so as to have the calcium sulphate comprise essentially dihydrate and a II-anhydrite content lying within a range between 5 and 30%, of the resulting calcium sulphate.

7. Method as defined in claim 3, in which a substantial part at least of that calcium sulphate being separated after the first step is returned in suspension in at least one reaction zone which is not crossed by the general circulation, so as to be able to control therein the reaction conditions substantially independently from the condition prevailing in the other reaction zones crossed by said general circulation.

8. Method as defined in claim 7, which further comprises retaining in that zone which is not crossed by the general circulation, a $P_2O_5$ content lower than the concentration prevailing in the other zones, said $P_2O_5$ lowering being balanced partly at least by a sulfuric acid feeding zone.

9. Method as defined in claim 1, which further comprises cycling part of the production phosphoric acid back to the calcium phosphate attack, to dilute the mixture.

10. Method as defined in claim 1, which further comprises washing part at least of the calcium sulphate, and cycling part at least of the resulting liquid phase back to the phosphate attack.

11. Method as defined in claim 3, which further comprises separating at the end of the first step, the production phosphoric acid and part at least of the calcium sulphate from the mixture, and cycling part of said acid back to the calcium phosphate attack in one at least of said reaction zones in said first step, to dilute the mixture, bringing in the second step, that calcium sulphate originating from the first step, in suspension into concentrated sulfuric acid and part of the liquids removed from the second step, the calcium sulphate resulting from the second step being in turn separated and the resulting liquid phase being cycled back to the calcium phosphate attack in the first step.

12. The method as defined in claim 1, which further comprises retaining in at least said two reaction zone parts, a solid content lying within a range between 15 and 45% and a residence or reaction time between 1 and 7 hours.

13. The method as defined in claim 1, which further comprises retaining in both said reaction zone parts, a $P_2O_5$ concentration lying within a range between 33 and 40%, and adjusting and combining the other parameters in said zones within said limits, so as to form essentially calcium sulphate dihydrate.

14. The method as defined in claim 1, which further comprises retaining in said reaction zones, a $P_2O_5$ concentration between 40 and 52%, and adjusting and combining the other parameters in said zones within said limits, in such a way as to form essentially calcium sulphate α-hemihydrate.

15. The method as defined in claim 1, which further comprises connecting the reaction zones from each both said parts together in a closed circuit.

16. The method as defined in claim 1, in which each both said reaction zone parts comprises at least one cooling zone.

17. The method as defined in claim 1, in which both said reaction zone parts comprise the reaction zones from a single step, or from the first step when operating in at least two succeeding steps between which a separation of at least part of the resuting calcium sulphate is provided.

18. The method as defined in claim 17, which further comprises separating by filtering, at least part of the resulting calcium sulphate after the reaction zones from the second part, subjecting said sulphate in a second step, to pulping back and a subsequent treatment with the possibly unseparated part of the resulting calcium sulphate and with liquid containing phosphoric acid and sulfuric acid, and thereafter separating, preferably also by filtering, the resulting calcium sulphate after said subsequent treatment.

19. Method as defined in claim 18, which further comprises subjecting substantially all the separated calcium sulphate during said second step, to a subsequent treatment under the following reaction conditions: a temperature lying between 30° and 105° C., a $P_2O_5$ concentration between 15 and 38%, a sulfuric acid concentration lying between 4 and 25%, a solid content lying between 20 and 62%, and a residence or reaction time lying between 0.5 and 18 hours.

20. The method as defined in claim, 19 which further comprises when the calcium sulphate to be pulped back contains essentially dihydrate, operating during the second step under the following reaction conditions: a temperature lying within a range between 70° and 85° C., a $P_2O_5$ concentration lying within a range between 15 and 25%, a sulfuric acid concentration lying within a range between 5 and 15%, a solid content lying within a range between 20 and 45%, and a residence or reaction time lying within a range between 0.5 and 3 hours, said reaction conditions being selected and combined within said limits so as to retain substantially unchanged the crystalline form of the pulped-back calcium sulphate.

21. The method as defined in claim 19, which further comprises when the calcium sulphate to be pulped back contains essentially dihydrate, operating during the second step under the following reaction conditions: a temperature lying within a range between 85° to 95° C., a $P_2O_5$ concentration lying within a range between 19 and 28%, a sulfuric acid concentration lying within a range between 6 and 15%, a solid content lying within a range between 20 and 45%, and a reaction or residence time lying within a range between 0.5 and 3 hours, said reaction conditions being selected and combined within said limits so as to obtain a calcium sulphate comprising essentially α-hemihydrate, II-anhydrite or -hemihydrate with a II-anhydrite content lying within a range between 5 and 20%, of the total resulting calcium sulphate.

22. The method as defined in claim 19, which further comprises when the calcium sulphate to be pulped back contains essentially dihydrate, operating during the second step under the following reaction conditions: a temperature lying within a range between 65° and 75° C., a $P_2O_5$ concentration lying within a range between 15 and 20%, a solid content lying within a range between 20 and 45%, and a residence or reaction time between 0.5 and 3 hours, said reaction conditions being selected and combined within said limits so as to obtain essentially II-anhydrite and a dihydrate content lying within a range between 5 and 20%, of the total calcium sulphate.

23. The method as defined in claim 1, which further comprises cycling at the most 10%, of that mixture leaving said second part of the reaction zones, back to said first part.

24. Method as defined in claim 1, which further comprises controlling the shape and size of the calcium sulphate crystals by adding activated silica and/or alumina to a reaction zone wherein feeding of the calcium phosphate to be treated occurs, or in one or a plurality of zones adjacent to said zone.

25. The method as defined in claim 1, which further comprises feeding to the reaction zones, calcium phosphate 95% of which at least has a granulometry smaller than 0.5% mm, and 60 to 70% of the grains are smaller than or equal to 0.150 mm.

26. The method of claim 2 wherein
said temperature is between 68° and 73° C.,
said $P_2O_5$ concentration is between 38 and 43%,
said solid content is between 23 and 36%, and
said reaction time is 2 to 5 hours.

27. The method of claim 3 wherein
said temperature is between 68° and 73° C.,
said $P_2O_5$ concentration is between 38 and 43%,
said solid content is between 23 and 36%, and
said reaction time is 2 to 5 hours.

28. The method of claim 3 wherein in the second step
said temperature is 75° to 80° C.,
said $P_2O_5$ concentration is 29–35%,
said sulfuric acid concentration is 10–15%,
said solid content is 24–30%,
said reaction time is 2 to 3 hours, and
said II-anhydrite content is 10 to 30%.

29. The method of claim 3 wherein in the second step:
said temperature is 40° to 45° C.,
said $P_2O_5$ concentration is 17–20%,
said sulfuric acid concentration is 12–15%,
said solid content is 45–58%,
said reaction time is 6 to 12 hours, and
said II-anhydrite content is 5 to 20%.

30. The method of claim 1 wherein in the first part of said reaction zone said temperature is between 78° and 82° C., in at least two reaction zone parts a solid content between 20 and 45%, and a reaction time between 2 and 5 hours.

31. The method of claim 13 wherein the $P_2O_5$ concentration is between 35 and 38%.

32. The method of claim 14 wherein the $P_2O_5$ concentration is between 40 and 46%.

33. The method of claim 20 wherein during the second step, said temperature is between 75° and 80° C., said $P_2O_5$ concentration is from 17 to 20%, said sulfuric acid concentration is between 8 and 12%, and said solid content is from 25 to 35%.

34. The method of claim 21 wherein during the second step said solid content is 24 to 35%, the residence time is from 1 to 1.5 hours, and the II-anhydrite content is between 5 and 15 %.

35. The method of claim 22 wherein during the second step the solid content is from 25 to 35%, the reaction time is 1 to 1.5 hours, and the II-anhdyrite content is between 5 and 10%.

36. Method for preparing phosphoric acid and calcium sulphate as by-product, wherein in a mixture containing calcium sulphate flowing through a sequence of reaction zones, calcium phosphate is subjected to an attack by a mixture of sulfuric and phosphoric acids, and part at least of the production phosphoric acid is removed, which comprises adjusting the circulating mixture flow rates relative to a mixture base flow rate which corresponds to the flow rate being discharged from the reaction zones, in conformity with the following specifications:
a general circulation through a majority of the reaction zones with a rate lying between 300 and 4000% of the base flow rate,
a circulation through a vacuum cooling zone with a rate lying between 2000 and 4000% of said base flow rate,
local circulations in the reaction zones with rates each lying between 500 and 2000% of the same base flow rate,
the sum of the general circulation and the local circulation being higher than or equal to 2500% of the base flow rate in every zone where reactants are being added, as well as in that zone which follows directly each said zones in the general circulation circuit, dividing these reaction zones in at least two succeeding steps by subjecting during a first step, in a mixture flowing through a sequence of reaction zones, calcium phosphate to an attack by a mixture of sulfuric and phosphoric acids while removing part at least of the production phosphoric acid and separating calcium sulphate, and retaining in said first step a temperature of 75° to 85° C. and a sulfuric concentration of 0.25 to 0.85%, and in a subsequent second step, substantially all the calcium sulphate produced during said step, to a treatment under the following reaction conditions:
a temperature lying between 65° and 75° C.,
a phosphoric acid with a $P_2O_5$ concentration lying between 14 and 38%,
a sulfuric concentration of between 1 and 2.5%,
a solid concentration lying between 20 and 62%, and
a residence or reaction time between 1 and 18 hours;
a substantial part at least of that calcium sulphate being separated after the first step is returned in suspension in at least one reaction zone which is not crossed by the general circulation, so as to be able to control therein the reaction conditions substantially independently from the conditions prevailing in the other reaction zones crossed by said general circulation, said reaction conditions being so selected and combined within said limits as to have the II-anhydrite content lying between 2 and 95% of the resulting calcium sulphate

* * * * *